United States Patent
Chawla et al.

(10) Patent No.: US 9,047,476 B2
(45) Date of Patent: Jun. 2, 2015

(54) BROWSER-BASED SECURE DESKTOP APPLICATIONS FOR OPEN COMPUTING PLATFORMS

(75) Inventors: Deepak Chawla, Ocean, NJ (US); Urs A. Muller, Keyport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 204 days.

(21) Appl. No.: 13/290,857

(22) Filed: Nov. 7, 2011

(65) Prior Publication Data

US 2013/0117804 A1    May 9, 2013

(51) Int. Cl.
| | |
|---|---|
| G06F 21/62 | (2013.01) |
| G06F 21/53 | (2013.01) |
| G06F 21/57 | (2013.01) |
| G06F 21/60 | (2013.01) |
| H04L 29/06 | (2006.01) |

(52) U.S. Cl.
CPC ............ G06F 21/606 (2013.01); H04L 63/20 (2013.01); G06F 21/53 (2013.01); G06F 21/6218 (2013.01); G06F 2221/2149 (2013.01); G06F 21/57 (2013.01); H04L 63/102 (2013.01)

(58) Field of Classification Search
CPC ....... H04L 63/10; H04L 63/102; H04L 63/20; G06F 21/57; G06F 21/53; G06F 21/62; G06F 21/606; G06F 21/6218; G06F 2221/2149
USPC ............................ 726/26–29, 1; 709/227, 229
See application file for complete search history.

(56) References Cited

U.S. PATENT DOCUMENTS

| | | | |
|---|---|---|---|
| 5,974,549 A * | 10/1999 | Golan | 726/23 |
| 6,212,564 B1 | 4/2001 | Harter et al. | |
| 6,571,245 B2 | 5/2003 | Chun et al. | |
| 6,981,281 B1 * | 12/2005 | LaMacchia et al. | 726/27 |
| 7,127,719 B2 | 10/2006 | Evans et al. | |
| 7,325,040 B2 | 1/2008 | Truong | |

(Continued)

FOREIGN PATENT DOCUMENTS

WO    2009015470    2/2009

OTHER PUBLICATIONS

Dierks et al., "The TLS Protocol: Version 1.0.," The Internet Society, Jan. 1999 (81 pages).

(Continued)

*Primary Examiner* — Zachary A Davis
(74) *Attorney, Agent, or Firm* — Hanley, Flight & Zimmerman, LLC

(57) ABSTRACT

Example browser-based secure desktop applications for open computing platforms are disclosed. An example method disclosed herein to provide secure desktop functionality to a computing platform comprises providing, in response to a first request, a secure desktop application to the computing platform, the secure desktop application for execution by a browser on the computing platform, and establishing a secure communication connection between a service node and the secure desktop application, the secure communication connection to provide the secure desktop application with access to a trusted entity, the secure communication connection being accessible to a trusted application downloaded to the computing platform for execution by the browser in association with the secure desktop application, the secure communication connection being inaccessible to an untrusted application not executed in association with the secure desktop application.

20 Claims, 11 Drawing Sheets

(56) References Cited

U.S. PATENT DOCUMENTS

| | | | |
|---|---|---|---|
| 7,346,649 B1* | 3/2008 | Wong | 709/203 |
| 7,430,743 B2* | 9/2008 | Watt et al. | 719/311 |
| 7,475,408 B2* | 1/2009 | Alcazar et al. | 719/330 |
| 7,627,658 B2* | 12/2009 | Levett et al. | 709/223 |
| 7,685,598 B1 | 3/2010 | Badenell et al. | |
| 7,832,004 B2 | 11/2010 | Schwartz et al. | |
| 7,873,071 B2 | 1/2011 | Ung et al. | |
| 8,225,404 B2* | 7/2012 | Freericks et al. | 726/24 |
| 2002/0010736 A1 | 1/2002 | Marques et al. | |
| 2002/0191797 A1 | 12/2002 | Perlman | |
| 2003/0041267 A1* | 2/2003 | Fee et al. | 713/201 |
| 2003/0159070 A1 | 8/2003 | Mayer et al. | |
| 2004/0039911 A1 | 2/2004 | Oka et al. | |
| 2005/0021668 A1* | 1/2005 | Beesley et al. | 709/217 |
| 2005/0267975 A1 | 12/2005 | Qureshi et al. | |
| 2007/0256073 A1 | 11/2007 | Troung et al. | |
| 2008/0016337 A1 | 1/2008 | Morgan et al. | |
| 2008/0123854 A1 | 5/2008 | Peel et al. | |
| 2009/0064311 A1 | 3/2009 | Clark et al. | |
| 2009/0106549 A1 | 4/2009 | Mohamed | |
| 2009/0187763 A1 | 7/2009 | Freericks et al. | |
| 2009/0187991 A1 | 7/2009 | Freericks et al. | |
| 2010/0153569 A1 | 6/2010 | Schreiber | |
| 2010/0269135 A1 | 10/2010 | Hulse et al. | |
| 2011/0247045 A1* | 10/2011 | Rajagopal et al. | 726/1 |
| 2013/0097688 A1* | 4/2013 | Bradley et al. | 726/9 |
| 2013/0117561 A1 | 5/2013 | Chawla et al. | |

OTHER PUBLICATIONS

USPTO, "Office Action," issued in connection with U.S. Appl. No. 13/290,852, dated Feb. 27, 2013 (17 pages).

USPTO, "Office Action," issued in connection with U.S. Appl. No. 13/290,852, dated Oct. 15, 2013, 21 pages.

United States Patent and Trademark Office, "Non-Final Office Action", issued in connection with U.S. Appl. No. 13/290,852, dated Dec. 9, 2014 (9 pages).

United States Patent and Trademark Office, "Notice of Allowance", issued in connection with U.S. Appl. No. 13/290,852 dated Mar. 30, 2015 (8 pages).

* cited by examiner

BROWSER-BASED SECURE DESKTOP APPLICATIONS FOR OPEN COMPUTING PLATFORMS

FIELD OF THE DISCLOSURE

This disclosure relates generally to computing platforms and, more particularly, to browser-based secure desktop applications for open computing platforms.

BACKGROUND

People routinely use computing devices, such as personal computers, smartphones, etc., to access and work with sensitive data, such as proprietary data, confidential data, sensitive personal information, etc. However, such sensitive data can be at risk of being compromised by malware that gains access to the user's computing device. As such, some enterprises (e.g., employers, retailers, governmental entities, etc.) restrict the computing devices that may be used to access sensitive data. Such restrictions can limit the user's choice of devices, or require the user to have multiple devices that perform similar functions.

DETAILED DESCRIPTION

Figure 1:
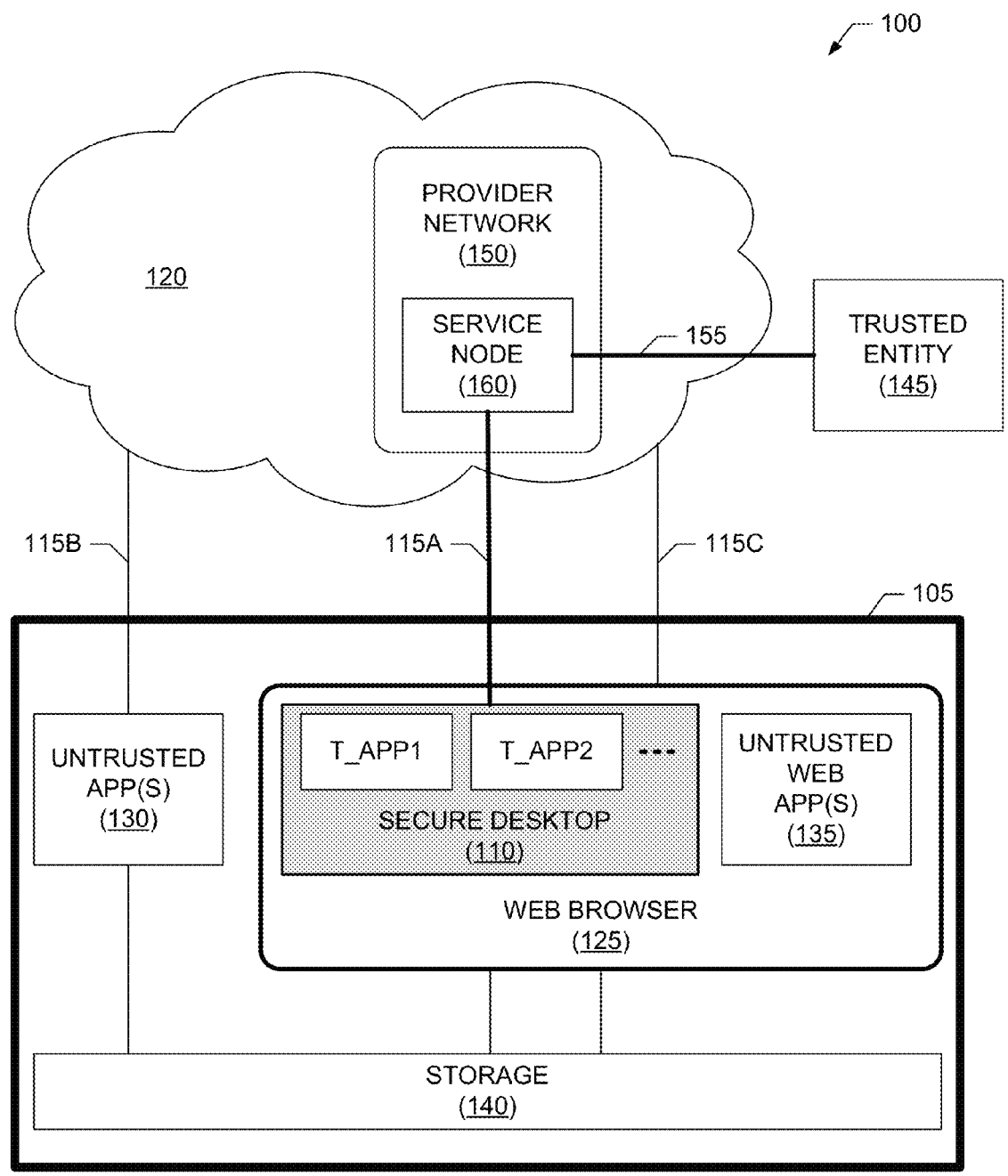
FIG. 1 is block diagram of an example system including an example service node and an example computing platform that support an example secure desktop as disclosed herein.

Example browser-based secure desktop applications for open computing platforms are disclosed herein. An example method disclosed herein, which may be performed by, for example, a provider network to provide secure desktop functionality to a computing platform, includes providing, in response to a first request, a secure desktop application to the computing platform for execution by a browser on the computing platform. In some examples, the first request corresponds to the browser being used to navigate to a server from which the secure desktop application can be downloaded. The example disclosed method also includes establishing a secure communication connection between a service node (e.g., in a provider network) and the secure desktop application. The secure communication connection provides the secure desktop application with access to a trusted entity. Furthermore, the secure communication connection is accessible to a trusted application downloaded to the computing platform for execution by the browser in association with the secure desktop application. However, the secure communication connection is inaccessible to an untrusted application not executed by the browser in association with the secure desktop application.

Some example methods further include providing, in response to a second request, the trusted application to the computing platform for execution by the browser in association with the secure desktop application. For example, the secure desktop application can cause the browser to navigate to a server from which trusted application(s) can be downloaded for execution by the browser in association with (e.g., in the context of) the secure desktop application. In this way, the functionality provided by the secure desktop application executing in the browser of the computing device can be augmented using, for example, plug-in trusted applications.

Some example methods also include storing data remotely from the computing platform, where the data is associated with a secure desktop session involving the secure desktop application. In some examples, storing data remotely from the computing platform permits a second secure desktop application (e.g., being executed by a second browser on a second computing platform) to use the data to join the secure desktop session. Additionally or alternatively, after execution of the secure desktop application by the browser is terminated, storing data remotely from the computing platform can, for example, permit a second secure desktop application (e.g., being executed by a second browser on a second computing platform) to use the data to resume the secure desktop session.

Some example methods include receiving a policy profile from the trusted entity, and enforcing a policy to control download of the trusted application to the browser in the computing platform based on the policy profile, and/or to control access to the trusted entity by the trusted application based on the policy profile, etc. In some examples, the policy profile includes a user profile, and enforcing the policy includes determining whether to permit the trusted application to have access to the trusted entity via the secure communication connection based on comparing user information for a user of the secure desktop application with the user profile. In some examples, the policy profile additionally or alternatively includes a device profile, and enforcing the policy additionally or alternatively includes determining whether to permit the trusted application to be downloaded to the browser in the computing platform based on comparing descriptive information for the computing platform with the device profile.

Other example methods disclosed herein may be performed by, for example, a secure desktop application executing in a browser on a computing platform, and include establishing a secure communication connection between a service node (e.g., of a provider network) and the secure desktop application. The secure communication connection provides access to a trusted entity. Furthermore, the secure communication connection is accessible to a trusted application downloaded for execution by the browser in association with the secure desktop application. However, the secure communication connection is inaccessible to an untrusted application not executed by the browser in association with the secure desktop application. Some such example methods also include downloading the trusted application for execution by the browser in association with the secure desktop application.

In some example methods, data associated with a secure desktop session (e.g., involving the secure desktop application) is stored remotely from the computing platform to enable the secure desktop session, for example, to be resumed after execution of the secure desktop application by the browser is terminated. In some example methods, data is stored by the secure desktop application securely in local storage associated with the computing platform. In such examples, the stored data is accessible to the trusted application and inaccessible to the untrusted application. In some examples, securing the stored data in the local storage includes using a set of keys (e.g., such as one or more public encryption keys) to perform just-in-time encryption of data to be written to the local storage, and using the set of keys to perform just-in-time decryption of data to be read from the local storage. In some examples, securing the stored data in the local storage further includes detecting termination of the secure communication connection between the trusted entity and the secure desktop, and revoking the set of keys after expiration of a time period beginning when the termination of the secure communication connection is detected (e.g., to support off-line access to the sensitive, secured data for a period of time after the secure connection to the trusted entity is terminated). Additionally or alternatively, in some examples the method waits to revoke the set of keys until the secure desktop itself is to be terminated to permit access to the sensitive, secured data while the secure desktop is active (even if the secure communication connection has been terminated).

Some example methods include exposing an application programming interface to trusted application(s) downloaded by the secure desktop application for execution by the browser. The application programming interface can enable the trusted application(s) to access the secure communication connection. Additionally or alternatively, the application programming interface can enable the trusted application(s) to access data that is stored securely in the local storage (e.g., via encryption). Additionally or alternatively, the application programming interface can enable a first trusted application to communicate with a second trusted application.

As noted above, some enterprises restrict the computing devices that may be used to access sensitive data to reduce the risk of the sensitive data being compromised by malware that gains access to the user's computing device. Some enterprises (e.g., such as in a banking application) may also require a user to perform an authentication procedure when accessing the enterprise from the user's computing device, especially when the computing device is not already associated with the user (such as when the user is accessing the enterprise from a public computer or someone else's computing device). However, such techniques may still be inadequate when it comes to preventing sensitive data from being compromised. For example, malware may still gain access to an enterprise-approved device, thereby permitting the malware to access an existing secure connection to the enterprise (e.g., such as a virtual private network established between the user's device and the enterprise) and/or to obtain authentication information used to authenticate the user, through which sensitive data can be siphoned off or otherwise compromised.

Unlike such prior techniques that attempt to mitigate the threat of unauthorized access to sensitive data, example methods, apparatus and articles of manufacture disclosed herein provide an on-demand, secure desktop environment for a computing platform that can prevent untrusted applications, such as malware, from accessing sensitive data associated with an enterprise or, more generally, a trusted entity. In some examples, the secure desktop environment is implemented by a secure desktop application that is provided on-demand to a web-browser on the computing platform for execution by the web-browser. As such, example on-demand secure desktop environments disclosed herein can be provided to almost any type of computing platform capable of running a web browser.

In some examples, an on-demand secure desktop environment (also referred to herein as an on-demand trusted enclave environment) provided to a computing platform as disclosed herein can prevent untrusted applications (e.g., malware) from accessing a secure connection established between a trusted entity and the secure desktop on an otherwise open computing platform. In some examples disclosed herein, the on-demand secure desktop environment can also prevent untrusted applications from being able to access and compromise sensitive data and/or authentication information that is stored locally on the otherwise open computing platform, and/or that is exchanged with the trusted entity via the secure connection. In some examples disclosed herein, the on-demand secure desktop environment can further prevent untrusted applications from communicating with the secure desktop environment and/or trusted applications executing in the context of the secure desktop environment.

Additionally or alternatively, in some examples disclosed herein, the on-demand secure desktop environment stores secure desktop session data remotely at the trusted entity or the provider network (e.g., such as in a cloud computing environment), to provide virtual, always-on functionality, as described in greater detail below. Furthermore, in some examples disclosed herein, policy management is supported. For example, user and/or device profiles may be specified by a trusted entity and/or a provider network to allow or block execution of certain trusted application(s) in the context of an on-demand secure desktop executing on a particular computing device for a particular user.

Turning to the figures, a block diagram of an example system 100 that includes an example computing platform 105 supporting an example on-demand secure desktop 110 as disclosed herein is illustrated in FIG. 1. The computing platform 105 may be implemented by any type(s) of computing device, such as any personal computer, laptop, smartphone, cellular phone, computing pad, personal digital assistant, tablet personal computer, personal communicator, kiosk, server, etc. In the illustrated example, the computing platform 105 is an open computing platform in which there are few, if any, inherent restrictions on which applications can and cannot be installed on and/or executed by the platform's operating system. As described in greater detail below, the secure desktop 110 of the illustrated example is able to provide a secure area and/or trusted enclave in the otherwise open computing platform 105.

The computing platform 105 of the illustrated example includes a communication interface to provide one or more example network connections 115A-C, such as one or more data streams, data sessions, etc., to an example communication network 120. In the illustrated example of FIG. 1, the communication network 120 is an open and untrusted network 120, such as the Internet. The network connections 115A-C can be established using any type(s) of wired and/or wireless technology capable of providing connectivity to the communication network 120. For example, the network connections 115A-C can correspond to a fiber, cable and/or digital subscriber line connection to an Internet service provider (ISP); one or more mobile (e.g., cellular) data channels conforming to any type of mobile network communication protocol, such as the 3rd Generation Partnership Project (3GPP) Long Term Evolution (LTE) wireless communication standard, the General Packet Radio Service (GPRS) for second generation (2G) protocol, the Wideband-Code Division Multiple Access (W-CDMA)-based third generation (3G) protocol, the Universal Mobile Telecommunication System (UMTS) protocol, the Global System for Mobile Communications (GSM) protocol, etc.; a wireless local area network (WLAN) connection; a Bluetooth connection; etc.

In the illustrated example, the network connection 115B is open and untrusted such that any client application executing on the computing platform 105 can use the network connection 115B to access the network 120. In the illustrated example, the network connection 115C is also open and untrusted such than an example web browser 125 executing on the computing platform 105, and/or web application(s) being executed by the web browser 125, can use the network connection 115C to access the network 120. The web browser 125 can be implemented by any type(s) of web browser, such as, but not limited to, Internet Explorer® by Microsoft®, Inc., Chrome™ by Google®, Inc., Firefox® by Mozilla®, Safari® by Apple®, Inc. etc. As used herein, an application can include, for example, any type(s) and/or number of computing application(s) or app(s), program(s), code(s), procedure(s), process(es), function(s), widget(s), etc., able to be installed on and/or executed or otherwise performed by the computing platform 105 (e.g., as a standalone client, or in conjunction with the web browser 125).

For example, the computing platform 105 of the illustrated example includes and is able to execute one or more example untrusted client application(s) 130 and/or one or more untrusted web application(s) 135. The untrusted client application(s) 130 include, for example, applications installed on and/or executed by the computing platform 105 as processing clients, but that do not undergo authentication and/or whose origins may be unknown. The untrusted web application(s) 135 include, for example, applications downloaded and executed by the web browser 125, but that also do not undergo authentication and/or whose origins may be unknown. As such, one or more of the untrusted client application(s) 130 and/or the untrusted web application(s) 135 could be malware and/or other malicious or unauthorized code that, for example, attempts to gain access to and compromise sensitive data stored on the computing platform 105.

In the illustrated example of FIG. 1, the untrusted client application(s) 130 and the untrusted web application(s) 135 executing on the computing platform 105 can access example storage 140 of the computing platform 105. As such, the untrusted client application(s) 130 and the untrusted web application(s) 135 can read data from and write data to the storage 140, which could enable malicious code to retrieve and/or overwrite (e.g., corrupt) unprotected sensitive data stored in the storage 140. The storage 140 can correspond to any type or combination of temporary and/or permanent tangible storage media, such as one or more of cache, volatile memory, flash memory, local disk storage, etc., including but not limited to the mass storage devices 1130 and/or volatile memory 1118 in the example processing system 1100 of FIG. 11, which is described in greater detail below. Although one storage element 140 is illustrated in the example of FIG. 1, the computing platform 105 can support an appropriate type(s) and/or number of storage elements 140.

Additionally, in the illustrated example of FIG. 1, the untrusted client application(s) 130 and the untrusted web application(s) 135 can also communicate or, in other words, exchange data with each other via, for example, inter-process connections. The inter-process connections can be implemented by inter-process communications, memory area mappings, signals, etc., and/or any other type(s) of inter-process connection(s) supported by the operating system and/or storage 140 of the computing platform 105.

As mentioned above, the computing platform 105 of the illustrated example includes the on-demand secure desktop 110 (also referred to herein as a secure desktop application, a trusted enclave application, etc.) to provide a secure area or trusted enclave in the otherwise open computing platform 105 via which an example trusted entity 145 and any associated sensitive data can be accessed in a secure manner. In the illustrated example, the on-demand secure desktop 110 provides access to the trusted entity 145 via the communication connection 115A, which is a secure connection between the on-demand secure desktop 110 and an example provider network 150 included in and/or implementing the network 120. The provider network 150, in turn, establishes an example secure connection 155 between the provider network 150 and the trusted entity 145. In the example provider network 150 of FIG. 1, an example service node 160 is included to support on-demand secure desktop functionality. For example, the service node 160 establishes the secure connection 155 between the provider network 150 and the trusted entity 145, and communicatively couples the secure connection 155 and the secure connection 115A to enable the on-demand secure desktop 110 to access the trusted entity 145. In some examples, the secure communication connections 115A and/or 155 correspond to one or more encrypted data streams, data sessions, etc., employing any type(s) of data encryption, such as encryption according to the data encryption standard (DES), advanced encryption standard (AES), etc. The service node 160 can be implemented by any type(s) or combination of one or more network nodes, computers, servers, etc.

From the perspective of the trusted entity 145, the secure desktop 110 is considered to be a trusted application. Trusted applications include, for example, applications that undergo authentication and/or whose origins can otherwise be known. The trusted entity 145 can correspond to any enterprise, business, server, computer, processing cloud, etc., accessible by the computing platform 105 and that employs authentication and/or other trusted computing techniques to establish trusted communications and/or data access for users, applications, devices, etc., that access the trusted entity 145.

In some examples, the on-demand secure desktop 110 is a trusted application from the perspective of the trusted entity 145, and is downloadable upon request and/or on-demand from the service node 160 to the web browser 125 on the computing platform 105. For example, a user of the computing platform 105 can navigate the web browser 125 to a web address or uniform resource locator (URL) (e.g., https://secure-desktop.att.com) for a server associated with, for example, the service node 160, the provider network 150 and/or the trusted entity 145, and from which the on-demand secure desktop 110 can be downloaded. In such examples, after being downloaded to the web browser 125, the on-demand secure desktop 110 is executed by the web browser 125 and establishes the secure communication connection 115A with the service node 160, as described in greater detail below. In the illustrated example, the service node 160 has already established the secure communication connection 155 with the trusted entity 145. Thus, the service node 160 is able to connect the secure connection 115A and the secure connection 115 to enable the on-demand secure desktop 110 to access the trusted entity 145.

Furthermore, the on-demand secure desktop 110 provides the communication endpoint for the secure connection 115A on the computing platform 105. As such, the secure connection 115A to the trusted entity 145 is accessible only via the secure desktop 110. This is unlike prior computing platforms in which a secure connection, such as a virtual private network (VPN), is terminated at the operating system and, thus, could be accessed by any application via the operating system. However, the secure communication connection 115A could be carried by a VPN established between the computing platform 105 and the service node 160 and/or the trusted entity 140. As described in greater detail below, to prevent the untrusted applications 130 and/or 135 from being able to access the secure connection 115A, the on-demand secure desktop 110 does not exchange data with the untrusted applications 130 and 135. Because the untrusted applications 130 and 135 cannot exchange data with the on-demand secure desktop 110, and the on-demand secure desktop 110 provides the communication endpoint for the secure connection 115A, the untrusted applications 130 and 135 also cannot access the secure connection 115A between the secure desktop 110 and the trusted entity 145. In some examples, the on-demand secure desktop 110 also provides local data security, via just-in-time encryption and decryption as described in greater detail below, to prevent the untrusted applications 130 and 135 from being able to access data stored by the on-demand secure desktop 110 in the otherwise unsecured local storage 140 of the computing platform 105.

In the example of FIG. 1, the service node 160 (and/or the provider network 150 in general, and/or the trusted entity 145) stores data, which is associated with secure desktop session(s) involving the on-demand secure desktop 110, remotely from the computing platform 105. By enabling secure desktop session data to be stored remotely, the system 100 of the illustrated example enables multiple on-demand secure desktops 110 on the same and/or different computing platforms 105 to join a collaborative secure desktop session. Such remote storage of secure desktop session data also permits a secure desktop session associated with a first on-demand secure desktop 110 to be resumed by a second on-demand secure desktop 110 (on the same or different computing platform 105) after, for example, the first on-demand secure desktop 110 has been terminated. Such examples of virtual, always-on secure desktop functionality capable of being supported by storing secure desktop session data remotely are described in greater detail below.

After being downloaded and launched by the web browser 125, the on-demand secure desktop 110 also supports downloading trusted applications, such as the trusted web applications T_APP1 and T_APP2, for execution by the web browser 125 in the secure context of the on-demand secure desktop 110. In the illustrated example, the trusted web applications T_APP1 and T_APP2 are downloaded from the service node 160 upon request (e.g., to enhance existing functionality and/or provide new functionality to the secure desktop 110) and, thus, are known to be trusted. In some examples, the on-demand secure desktop 110 can also authenticate the trusted web applications T_APP1 and T_APP2 after being downloaded to further establish that these web applications are trusted. Although two (2) trusted applications T_APP1 and T_APP2 are illustrated in the example of FIG. 1, the on-demand secure desktop 110 in the computing platform 105 can support any appropriate number of trusted applications.

Because the trusted applications T_APP1 and T_APP2 execute in the context of the on-demand secure desktop 110 (e.g., via an application programming interface described in greater detail below), the trusted applications T_APP1 and T_APP2 can access the secure connection 115A and, thus, the trusted entity 145. Additionally or alternatively, the trusted applications T_APP1 and T_APP2 can access the secure session data stored locally in the storage 140 and/or remotely by the service node 160 (and/or the provider network 150 in general, and/or the trusted entity 145). Additionally or alternatively, the on-demand secure desktop 110 enables the trusted applications T_APP1 and T_APP2 to intercommunicate and exchange data.

In some examples, the service node 160 provides policy enforcement to determine which trusted applications T_APP1 and T_APP2 are permitted to be downloaded to and/or executed on a particular computing device 105, which trusted applications T_APP1 and T_APP2 are permitted to access the secure connection 115A, etc. Additionally or alternatively, the service node 160 provides policy enforcement to initially determine whether the on-demand secure desktop can be downloaded to a particular computing platform 105. Such policy enforcement can be based on one or more profiles specified by the trusted entity 145 and/or the provider network 150, as described in greater detail below.

Although the example computing platform 105 is illustrated in FIG. 1 as supporting one on-demand secure desktop 110 providing one secure connection 115A to one trusted entity 145 via one service node 160 in one provider network 150, the on-demand secure desktop 110 can be used to provide multiple secure connections 115A and 155 to the same or different trusted entities 145 over the same or different networks 120 and/or 150 using any number of service nodes 160. Furthermore, multiple on-demand secure desktops 110 can be included in or executed by the computing platform 105 to provide, for example, different respective secure connections 115A to different respective trusted entities 145.

Figure 2:
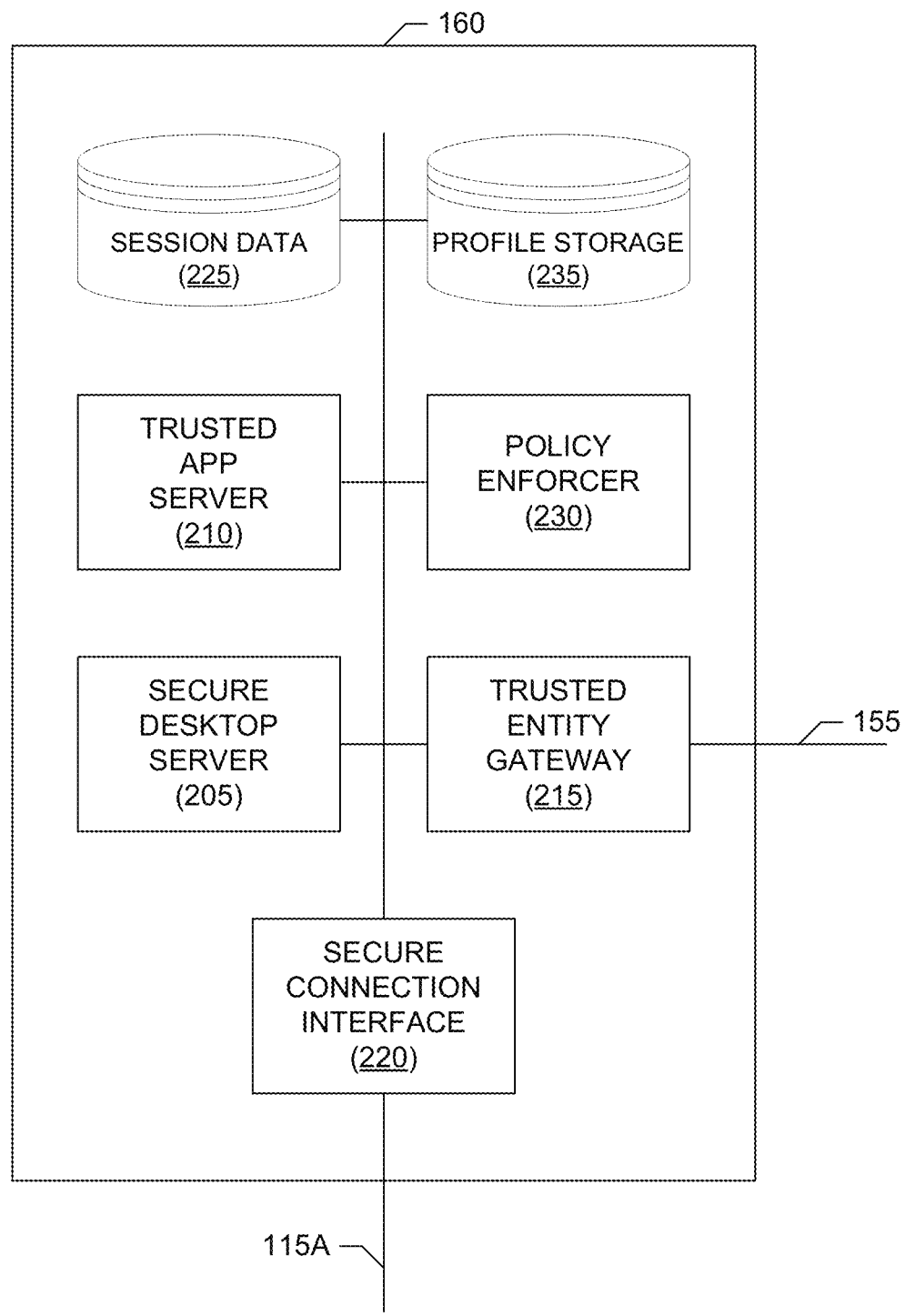
FIG. 2 is a block diagram illustrating an example implementation of the service node of FIG. 1.

A block diagram of an example implementation of the example service node 160 in the provider network 150 of FIG. 1 is illustrated in FIG. 2. Similar elements in FIGS. 1 and 2 are labeled with the same reference numerals. The example service node 160 of FIG. 2 includes an example secure desktop server 205 to store on-demand secure desktop application(s) 110 for downloading to one or more computing platforms 105. For example, the on-demand secure desktop 110 can be implemented as a web application that can be downloaded on-demand from the secure desktop server 205 (and/or one or more other servers associated with the service node 160, the provider network 150, the trusted entity 145, etc.) to the computing platform 105. As mentioned above, the web browser 125 of the computing platform 105 can be used to navigate to a URL of the secure desktop server 205 and to request downloading of the on-demand secure desktop application 110. After being downloaded by the web browser 125, the on-demand secure desktop 110 is executed by the web browser 125 as a web application. Because the on-demand secure desktop 110 is implemented as a web application in this example, the on-demand secure desktop 110 does not involve installation of client software on the computing platform 105 and can be implemented in a manner that is device independent and/or operating system (OS) independent, thereby facilitating downloading to any type of computing device, such as personal laptops, web kiosks, borrowed laptops, hotel personal computers, etc.

The example service node 160 of FIG. 2 also includes an example trusted application server 210 to store trusted applications, such as the trusted applications T_APP1 and/or T_APP2, for downloading to one or more computing platforms 105 that are executing on-demand secure desktop(s) 110. The trusted applications stored on the trusted application server 210 can be used, for example, to enhance and/or augment existing functionality and/or add new functionality to be provided by the on-demand secure desktop 110. In some examples, a trusted application stored by the trusted application server 210 is downloaded into an on-demand secure desktop 110 that has already been launched by an associated web browser 125. In this way, the on-demand secure desktop 110 can be provided with the latest version(s) of the requested trusted application(s) after being launched by the web browser 125 on the computing platform 105. In such examples, the secure desktop server 205 and the trusted applications server 210 can be implemented by the same or different servers, computers, etc., and are responsible for storing the latest version of the secure desktop application(s) 110 and the associated trusted applications T_APP1, T_APP2, etc.

The example service node 160 of FIG. 2 further includes an example trusted entity gateway 215 and an example secure connection interface 220 to establish secure connection(s) between the on-demand secure desktop 110 executing on the computing platform 105 and one or more trusted entities 145. In the illustrated example, the trusted entity gateway 215 is used to establish secure connection(s) (e.g., such as the secure connection 155) between the service node 160 and one or more trusted entities 145, and the secure connection interface 220 is used to establish secure connection(s) (e.g., such as the secure connection 115A) between the on-demand secure desktop 110 and the service node 160. The secure connection interface 220 also joins the secure connection(s) with the on-demand secure desktop 110 to the appropriate secure connection(s) with the one or more trusted entities 145. The secure communication connections implemented by the trusted entity gateway 215 and the secure connection interface 220 can be any type of secure connections implemented using any type of secure connection technology, such as public key encryption, symmetric key encryption, certificates, two-factor authentication, etc.

As mentioned above, secure desktop session data associated with the on-demand secure desktop 110 and/or one or more of the trusted applications T_APP1, T_APP2, etc., can be stored locally on the computing platform 105 (e.g., in the storage 140) and/or remotely at the service node 160, provider network 150 and/or trusted entity 145. Such secure desktop session data can include, for example, sensitive data obtained from and/or provided to the trusted entity 145 and/or processed by the on-demand secure desktop 110 and/or one or more of the trusted applications T_APP1, T_APP2, etc. To store secure desktop session data remotely from the computing platform(s) 105, the service node 160 of FIG. 2 includes example session data storage 225. The session data storage 225 can be implemented by any type or combination of memory and/or storage technology, such as one or more of the mass storage devices 1130 and/or volatile memory 1118 in the example processing system 1100 of FIG. 11, which is described in greater detail below.

When secure desktop session data is stored remotely at the session data storage 225 (and/or elsewhere at the service node 160, the provider network 150, the trusted entity 145, etc.), the on-demand secure desktop 110 of the illustrated example provides virtual, always-on functionality. For example, a web application, such as the on-demand secure desktop 110, usually stops executing once it is exited, and any session context associated with the web application is lost. However, when the secure desktop session data being used by the on-demand secure desktop 110 is stored remotely (e.g., at the session data storage 225), the on-demand secure desktop 110 maintains a virtual presence in the provider network 150. In other words, the session context of the on-demand secure desktop 110 can be maintained even after the computing platform 105 closes or exits the on-demand secure desktop 110. As such, a user can move between computing platforms 105 seamlessly, or use multiple computing platforms 105 in parallel, without interrupting the session context of the on-demand secure desktop 110, which is maintained in the provider network 150 (e.g., at the session data storage 225 of the service node 160). For example, multiple on-demand secure desktops 110 on the same and/or different computing platforms 105 can use secure desktop session data stored at the session data storage 225 to join a collaborative secure desktop session. As another example, a secure desktop session associated with a first on-demand secure desktop 110 that has been terminated can be resumed by a second on-demand secure desktop 110 (e.g., running on the same or different computing platform 105) by accessing the secure desktop session data stored at the session data storage 225 for the first on-demand secure desktop 110.

The service node 160 of FIG. 2 includes an example policy enforcer 230 to support policy enforcement and associated profile management with respect to operation of on-demand secure desktop(s) 110 in the system 100. In some examples, the provider network 150 and/or one or more trusted entities 145 may specify policy profile(s) for use by the policy enforcer 230 to determine whether a secure desktop application 110 can be downloaded by the secure desktop server 205 to a particular computing platform 105, whether a particular trusted application can be downloaded by the trusted application server 210 to a particular secure desktop 110 (e.g., associated with a particular platform 105 and/or a particular user), whether a particular trusted application can be executed by a particular secure desktop 110 (e.g., associated with a particular platform 105 and/or a particular user) and/or granted access to the secure connection 115A to the trusted entity 145, etc. The policy profile(s) can be stored at an example profile storage 235. The profile storage 235 can be implemented by any type or combination of memory and/or storage technology, such as one or more of the mass storage devices 1130 and/or volatile memory 1118 in the example processing system 1100 of FIG. 11, which is described in greater detail below.

For example, the provider network 150 and/or one or more trusted entities 145 may specify and provide device profile(s) associated with respective computing platform(s) 105, and/or user profile(s) associated with respective user(s), which can be used to customize operation of the on-demand secure desktop 110 on a particular computing platform 105 and/or a particular user. The policy enforcer 230 uses the device profile(s) and/or user profile(s) stored at the profile storage 235 to enforce policies affecting operation of the on-demand secure desktop 110 on a particular computing platform 105 and/or a particular user. For example, the policy enforcer 230 can process a user policy to determine whether to allow or block execution of one or more particular trusted apps in the on-demand secure desktop 110 executing on a particular computing device 105 based on comparing the user policy with user information associated with a particular user. As another example, the policy enforcer 230 can process a device policy for a particular computing platform 105 to determine whether to allow or block execution of one or more particular apps based on comparing the device policy with descriptive information associated with the particular computing platform 105. For example, device profiles could be used to block a particular trusted application from executing when the on-demand secure desktop 110 in which it is being executed is on a device that is not an authorized computing platform 105 for that trusted application. In some examples, the policy enforcer 230 additionally or alternatively uses the device profile(s) and/or user profile(s) to determine whether the secure desktop server 205 is to respond to a request to download the on-demand secure desktop application 110 to a particular computing platform 105 associated with a particular user in the first place.

Figure 3:
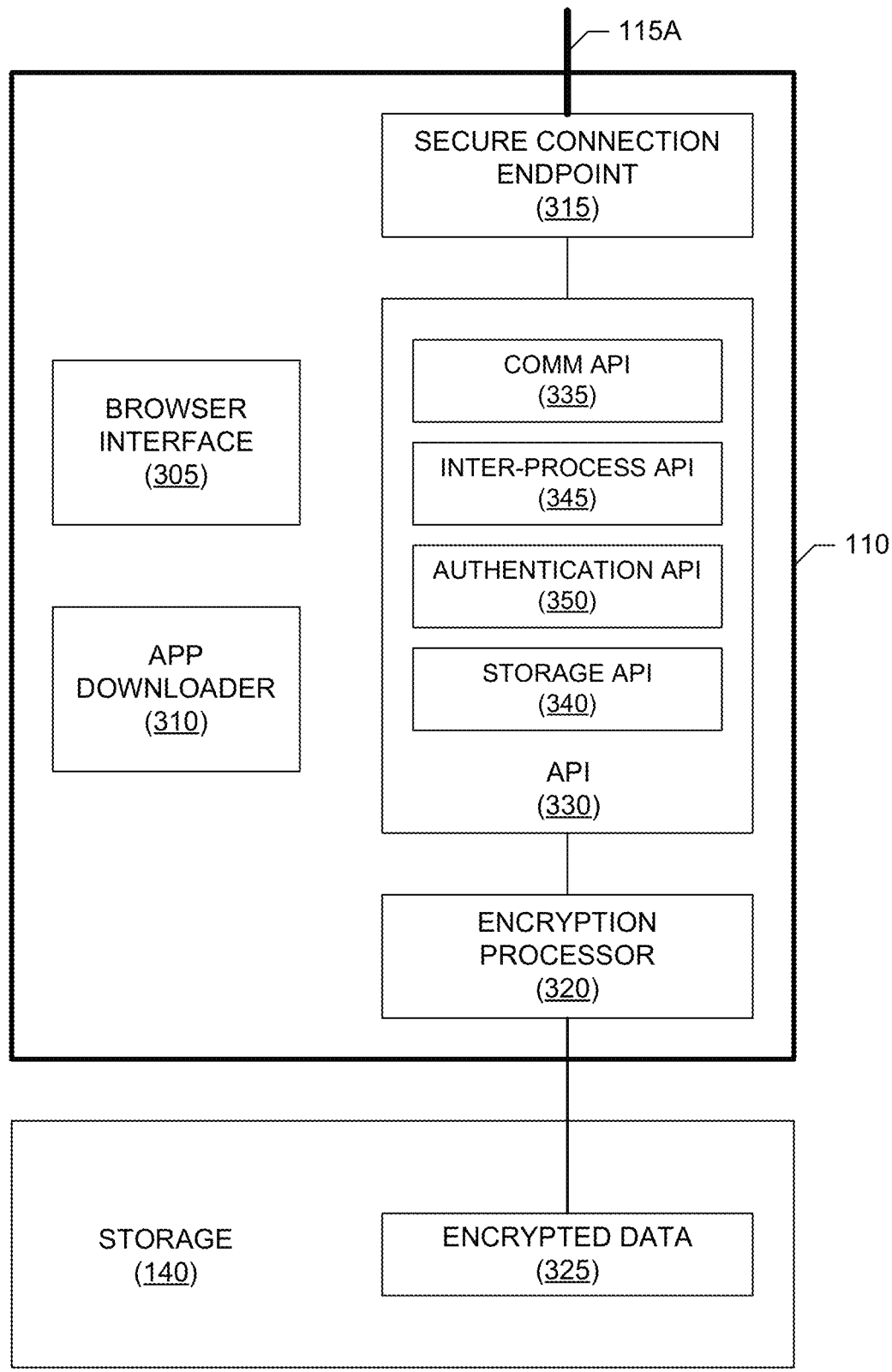
FIG. 3 is a block diagram illustrating an example implementation of the secure desktop of FIG. 1.

A block diagram of an example implementation of the on-demand secure desktop 110 of FIG. 1 is illustrated in FIG. 3. Similar elements in FIGS. 1-3 are labeled with the same reference numerals. The on-demand secure desktop 110 of FIG. 3 includes an example browser interface 305 to enable the on-demand secure desktop 110 to be executed by a web browser, such as the web browser 125 on the computing platform 105. In the illustrated example of FIG. 3, the on-demand secure desktop 110 also includes an example application downloader 310 to enable trusted application(s), such as the trusted applications T_APP1, T_APP2, etc., to be selected, requested for download and executed by the web browser 125 in the context of the on-demand secure desktop 110. For example, the browser interface 305 and the application downloader 310 can be implemented to support hypertext markup language 5 (HTML5) and/or any other type of language, protocol, interface, etc., that enables the on-demand secure desktop 110 to interface with and be executed by the web browser 125.

The on-demand secure desktop 110 of FIG. 3 further includes an example secure connection endpoint 315 to establish the secure connection 115A with the trusted entity 145 and to provide the endpoint on the computing platform 105 for the secure connection 115A. For example, the secure connection 115A established by the secure connection endpoint 315 can be any type of secure connection implemented using any type of secure connection technology, such as public key encryption, symmetric key encryption, certificates, two-factor authentication, etc. In some examples, the secure connection 115A is established after the secure connection endpoint 315 has authenticated a user of the secure desktop 110 with the trusted entity 145 and/or the service node 160 of the provider network 150. For example, the secure connection endpoint 315 provides authentication information for a user to the service node 160 to enable the service node 160 to authenticate the user and, when authentication is successful, permit the secure connection endpoint 315 of the secure desktop 110 to establish the secure connection 115A. Examples of such authentication information for a user of the secure desktop 110 include, but are not limited to, username and password information, biometric information, etc., and/or other information to support one, two or multiple factor authentication.

The secure desktop 110 of FIG. 3 also includes an example encryption processor 320 to store local data 325 securely in the storage 140 for use by the secure desktop 110. In some examples, sensitive data used by the secure desktop 110, and/or one or more trusted applications executing in the context of the secure desktop 110, is stored at the trusted entity 145, at the service node 160 of the provider network 150, in a network cloud, etc. However, the secure desktop 110 also supports storing data locally (e.g., in the computing platform 105) in a secure manner such that any sensitive data included in the stored local data is secure. Thus, the encryption processor 320 protects the local data 325 stored by the secure desktop 110 from being read and compromised by, for example, one or more of the untrusted applications 130 and/or 135. For example, the encryption processor 320 can use any type of key-based encryption (e.g., public-key encryption, symmetric-key encryption, etc.) to secure the local data 325 in the storage 140. In some examples, the encryption processor 320 provides just-in-time encryption of the local data 325 when the local data 325 is being written to the storage 140 by the secure desktop 110 and/or one or more trusted applications executing in the context of the secure desktop 110. In such an example, the encryption processor 320 also provides just-in-time decryption of the local data 325 when the local data 325 is being read from the storage 140 by the secure desktop 110 and/or one or more trusted applications executing in the context of the secure desktop 110. Because untrusted applications, such as the applications 130 and/or 135, do not possess or otherwise have access to the encryption key(s) used by the encryption processor 320 to decrypt and/or encrypt the encrypted local data 325, the encrypted local data 325 is secure and protected from unauthorized or otherwise improper access by any untrusted application.

In some examples, the encryption processor 320 generates the set of one or more encryption keys to be used to encrypt the local data 325 using any type of key generation algorithm using any appropriate input information, such as user information (e.g., username, password, etc.) provided by a user, biometric data, data obtained from a security token, etc., or any combination thereof In some examples, the trusted entity 145 and/or the service node 160 associated with a particular secure connection 115A is/are responsible for managing and providing the set of one or more encryption keys to be used by the encryption processor 320 to encrypt local data 325 associated with that particular trusted entity. In such examples, the encryption processor 320 receives the set of keys for encrypting the local data from the appropriate trusted entity 145 and/or service node 160 over the secure connection 115A that has already been established with the service node 160 (and, thus, the trusted entity 145). The encryption processor 320 then uses the generated/received set of keys to perform just-in-time encryption of data related to the trusted entity 145 that is to be written to the local storage 140, and to perform just-in-time decryption of this data when it is to be read from the local storage 140. In some examples, when the secure desktop 110 detects that the secure connection 115A associated with the trusted entity 145 has terminated (e.g., voluntarily by the secure desktop 110 and/or the trusted entity 145, or involuntarily due to one or more error conditions), the encryption processor 320 revokes (e.g., by randomization or other intentional overwriting and/or corruption of the stored key(s) to make the key(s) unusable) or otherwise discards the set of encryption keys to protect the local data 325 from any subsequent access attempts. Additionally or alternatively, in some examples the encryption processor 320 waits to revoke the set of keys until the secure desktop itself 110 is to be terminated to permit access to the sensitive, secured data while the secure desktop 110 is active (even if the secure connection 115A has been terminated). When the computing platform 105 is a portable or shared platform, the foregoing feature(s) can be especially useful for protecting sensitive data included in encrypted local data 325 when the computing platform 105 is lost or being used by a different user.

In some examples, the encryption processor 320 may wait until after expiration of a time period beginning when termination of the secure connection 115A is detected to revoke or otherwise discard the set of encryption keys used to encrypt the local data 215 and/or service node 160. In this way, the encryption processor 320 can support an associated period of time during which off-line access to the encrypted local data 325 is permitted. The time period for off-line access can be a configuration parameter of the secure desktop 110, a parameter provided by the trusted entity 145, a parameter provided by the service node 160, a parameter entered by a user, etc.

The secure desktop 110 of FIG. 3 also includes an example application programming interface (API) 330 to enable one or more trusted applications to access the secure desktop 110 and thereby access the secure connection 115A and the encrypted local data 325 provided by the secure desktop 110. In other words, the API 330 provides a plug-in interface via which trusted application(s) (e.g., trusted plug-in extensions) can be downloaded and executed by the web browser 125 in the context of the secure desktop 110. In this way, the API 330 supports extending the capabilities of the secure desktop 110 over time. The API 330 can be implemented as part of a software development kit (SDK) and/or any other type of API architecture.

In the illustrated example, the API 330 includes an example communication API 335, an example storage API 340, an example inter-process API 345 and an example authentication API 350. In the example of FIG. 3, the communication API 335 provides trusted applications with access to the secure connection 115A provided by the secure desktop 110. For example, the communication API 335 can be used by a trusted application to provide data to the secure connection endpoint 315 that is to be sent to the trusted entity 145 via the secure connection 115A. The communication API 335 can also be used by the trusted application to obtain data from the secure desktop 110 that has been received from the trusted entity 145 via the secure connection 115A and the secure connection endpoint 315.

In the example of FIG. 3, the storage API 340 provides trusted applications with access to the encrypted local data 325 stored in the storage 140. For example, the storage API 340 can be used by a trusted application to provide data to the secure desktop 110 that is to be included by the encryption processor 320 in the secure local data 325 written to the storage 140. The storage API 340 can also be used by the trusted application to retrieve data from the secure desktop 110 that is read by the encryption processor 320 from the secure local data 325 stored in the storage 140.

In the example of FIG. 3, the inter-process API 345 provides trusted applications with access to other trusted applications executing in the context of the secure desktop 110. For example, the inter-process API 345 can be used by a trusted application to address and communicate data to another trusted application already associated with the secure desktop 110. The inter-process API 345 can also be used by the trusted application to address and receive data from another trusted application already associated with the secure desktop 110.

In some examples, the secure desktop 110 does not expose the API 330 (or at least some portions of the API 330) to an application until the application has been authenticated by the secure desktop 110 and thereby becomes a trusted application. This feature can prevent untrusted applications, such as the applications 130 and/or 135, from accessing the API 330 and gaining access to the secure connection 115A, the encrypted local data 325 and/or one or more trusted applications. For example, the secure desktop 110 may expose just the authentication API 350 to an application requesting access to thereby provide an interface via which the application can be authenticated. The application can then use the authentication API 350 to provide authentication information, such as a digital certificate and/or signature associated with the application, an identification checksum associated with the application, signed identification information, etc. Upon successful authentication of the application, the secure desktop 110 considers the application to be a trusted application and exposes the rest of the API 330 (or one or more of the other API components 335-345) to this trusted application.

Figure 4:
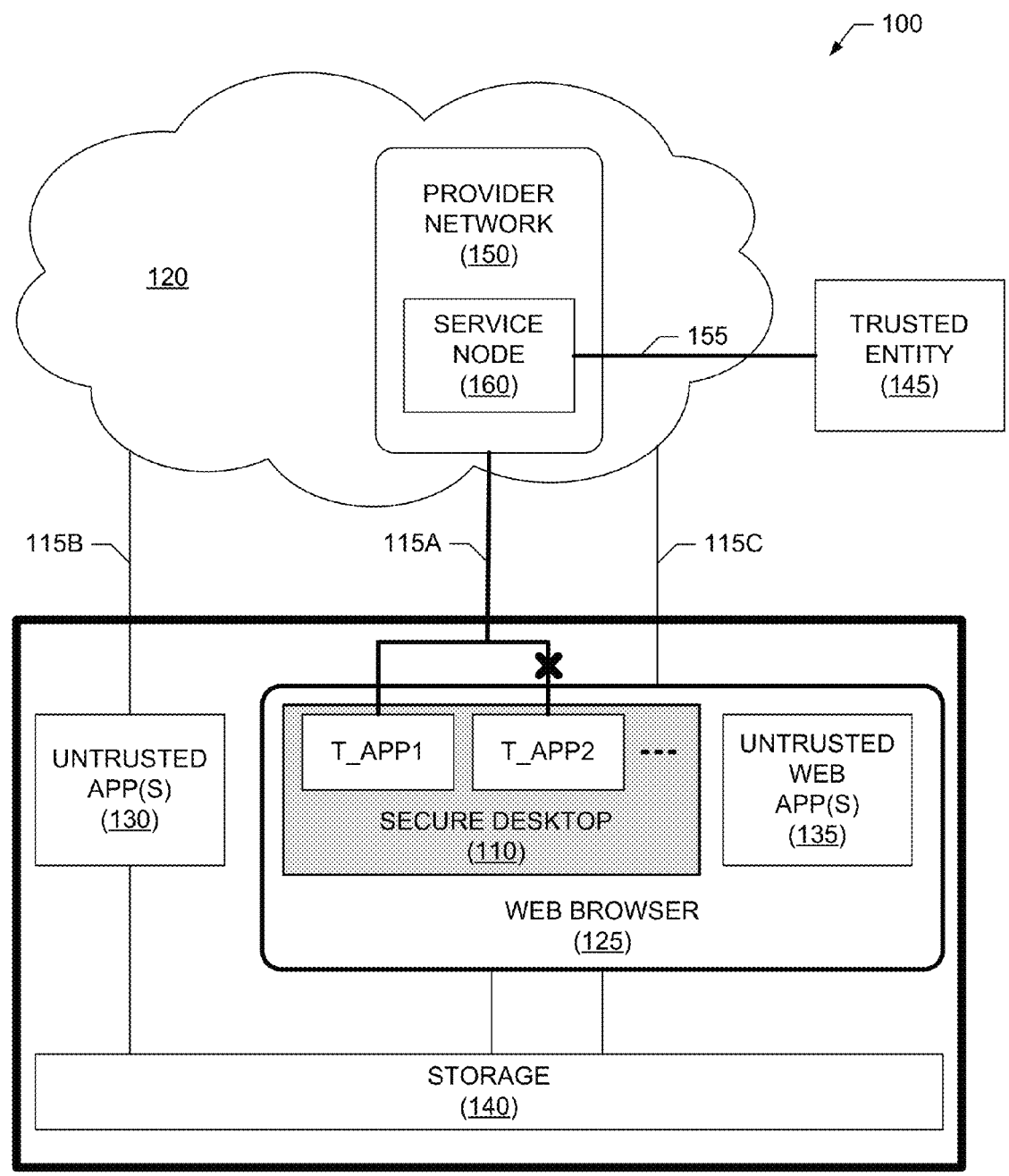
FIG. 4 is a block diagram illustrating an example operation of the service node and the secure desktop of FIGS. 1-3 in the example system of FIG. 1.

FIG. 4 is a block diagram illustrating the service node 160 of the provider network 150 performing example policy enforcement to control operation of the on-demand secure desktop 110 of FIGS. 1-3. Similar elements in FIGS. 1-4 are labeled with the same reference numerals. As described above, the service node 160 can use device profile(s) and/or user profile(s) to enforce policies affecting operation of the on-demand secure desktop 110 on a particular computing platform 105 and/or for a particular user. Furthermore, in some examples, users could be associated with respective user profiles and/or each computing platform 105 could be associated with respective device profiles to enable on-demand secure desktops 110 to be customized to a particular user and/or a particular computing platform 105.

In the illustrated example of FIG. 4, the service node 160 evaluates a device policy associated with the computing platform 105 and/or a user policy associated with a user of the computing platform 105 to decide to permit the trusted application T_APP1 to execute and access the secure connection 115A, but blocks the trusted application T_APP2 from being able to execute and/or access the secure connection 115A. For example, the service node 160 can block execution of the trusted application T_APP2 for a particular user based on the user's profile stored at the service node 160. As another example, the service node 160 can block execution of the trusted application T_APP2 for the particular computing platform 105 (e.g., because the platform 105 is not an enterprise approved platform) based on the platform's device profile stored at the service node 160. In such an example, if a user is using multiple computing platforms 105 to invoke secure desktops 110 and trusted applications T_APP1 and T_APP2, the user might be able to execute trusted application T_APP2 on an approved platform 105 (e.g., an enterprise approved device), but not on an unapproved platform 105 (e.g., a personal computing device). In some examples, the service node 160 checks user and/or device profiles to perform policy management each time the on-demand secure desktop 110 is launched and/or each time a trusted application, such as one of the trusted applications T_APP1, T_APP2, etc., is downloaded and/or executed.

While example manners of implementing the secure desktop 110 and the service node 160 have been illustrated in FIGS. 1-4, one or more of the elements, processes and/or devices illustrated in FIGS. 1-4 may be combined, divided, re-arranged, omitted, eliminated and/or implemented in any other way. Further, the example secure desktop server 205, the example trusted application server 210, the example trusted entity gateway 215, the example secure connection interface 220, the example policy enforcer 230, the example browser interface 305, the example application downloader 310, the example secure connection endpoint 315, the example encryption processor 320, the example API 330, the example communication API 335, the example storage API 340, the example inter-process API 345, the example authentication API 350 and/or, more generally, the example secure desktop 110 and/or the example service node 160 of FIGS. 1-4 may be implemented by hardware, software, firmware and/or any combination of hardware, software and/or firmware. Thus, for example, any of the example secure desktop server 205, the example trusted application server 210, the example trusted entity gateway 215, the example secure connection interface 220, the example policy enforcer 230, the example browser interface 305, the example application downloader 310, the example secure connection endpoint 315, the example encryption processor 320, the example API 330, the example communication API 335, the example storage API 340, the example inter-process API 345, the example authentication API 350 and/or, more generally, the example secure desktop 110 and/or the example service node 160 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example secure desktop 110, the example service node 160, the example secure desktop server 205, the example trusted application server 210, the example trusted entity gateway 215, the example secure connection interface 220, the example policy enforcer 230, the example browser interface 305, the example application downloader 310, the example secure connection endpoint 315, the example encryption processor 320, the example API 330, the example communication API 335, the example storage API 340, the example inter-process API 345 and/or the example authentication API 350 are hereby expressly defined to include a tangible computer readable medium such as a memory, digital versatile disk (DVD), compact disk (CD), etc., storing such software and/or firmware. Further still, the example secure desktop 110 and/or the example service node 160 of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions that may be executed to implement the example secure desktop 110, the example service node 160, the example secure desktop server 205, the example trusted application server 210, the example trusted entity gateway 215, the example secure connection interface 220, the example policy enforcer 230, the example browser interface 305, the example application downloader 310, the example secure connection endpoint 315, the example encryption processor 320, the example API 330, the example communication API 335, the example storage API 340, the example inter-process API 345 and/or the example authentication API 350 are shown in FIGS. 5-10. In these examples, the machine readable instructions represented by each flowchart may comprise one or more programs for execution by a processor, such as the processor 1112 shown in the example processing system 1100 discussed below in connection with FIG. 11. Alternatively, the entire program or programs and/or portions thereof implementing one or more of the processes represented by the flowcharts of FIGS. 5-10 could be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 5-10 may be implemented manually. Further, although the example machine readable instructions are described with reference to the flowcharts illustrated in FIGS. 5-10, many other techniques for implementing the example methods and apparatus described herein may alternatively be used. For example, with reference to the flowcharts illustrated in FIGS. 5-10, the order of execution of the blocks may be changed, and/or some of the blocks described may be changed, eliminated, combined and/or subdivided into multiple blocks.

As mentioned above, the example processes of FIGS. 5-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 5:
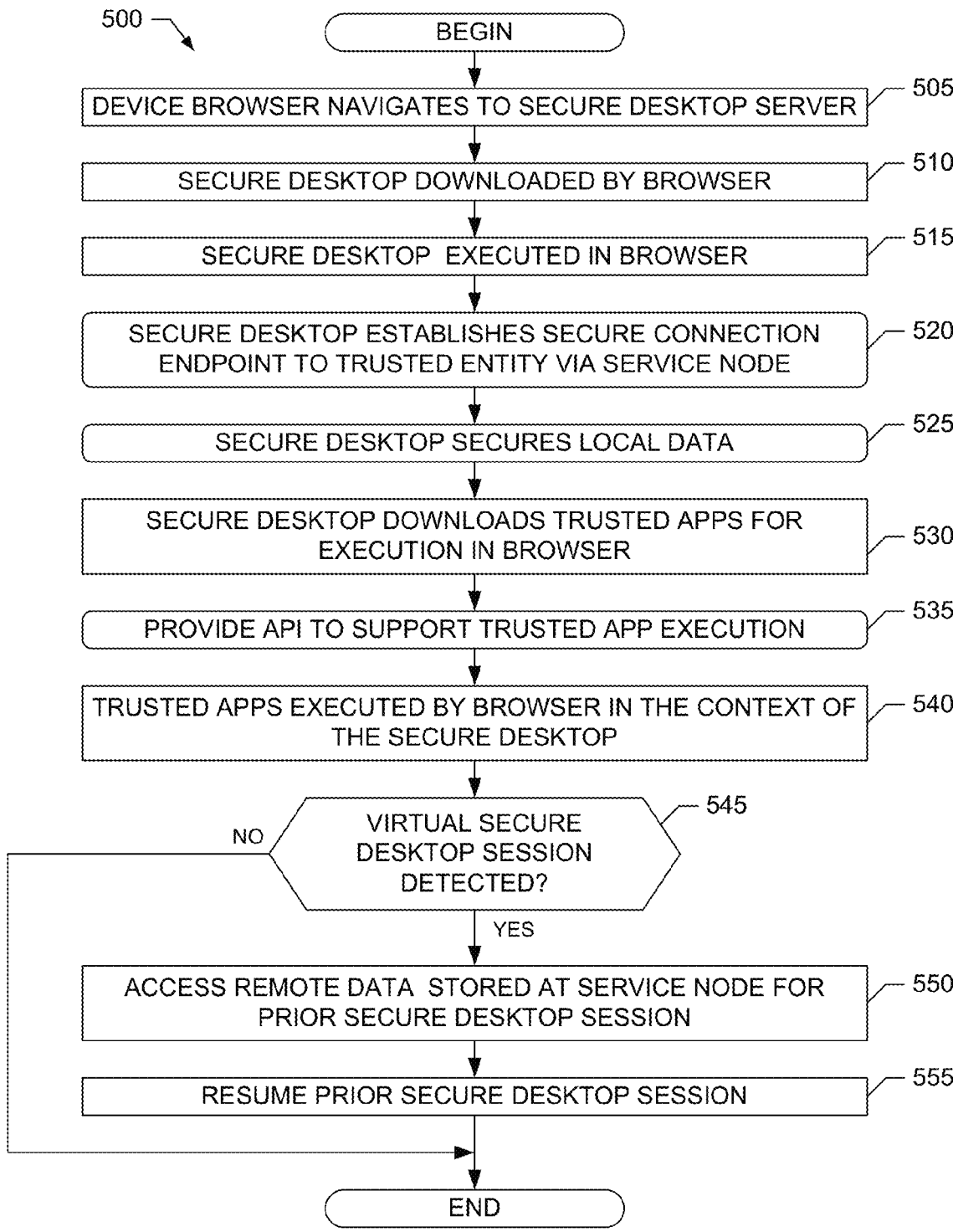
FIG. 5 is a flowchart representative of example machine readable instructions that may be executed to implement the example secure desktop of FIGS. 1 and/or 3.
Figure 6:
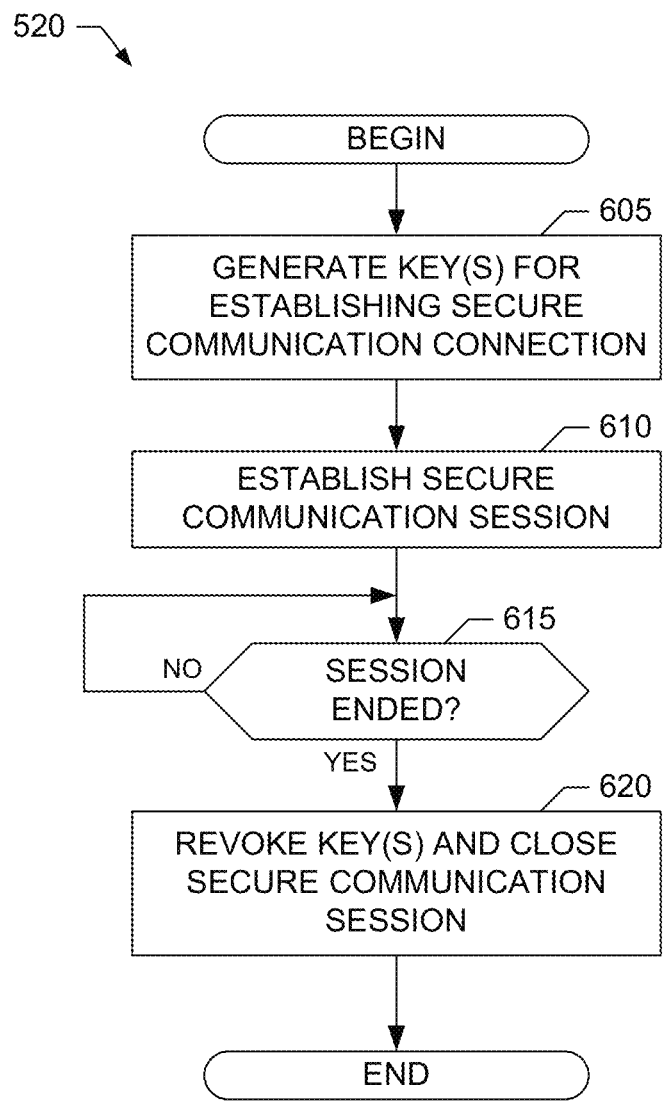
FIG. 6 is a flowchart representative of example machine readable instructions to implement a secure connection endpoint that may be used to implement the example machine readable instructions of FIG. 5 and/or the example secure desktop of FIGS. 1 and/or 3.
Figure 7:
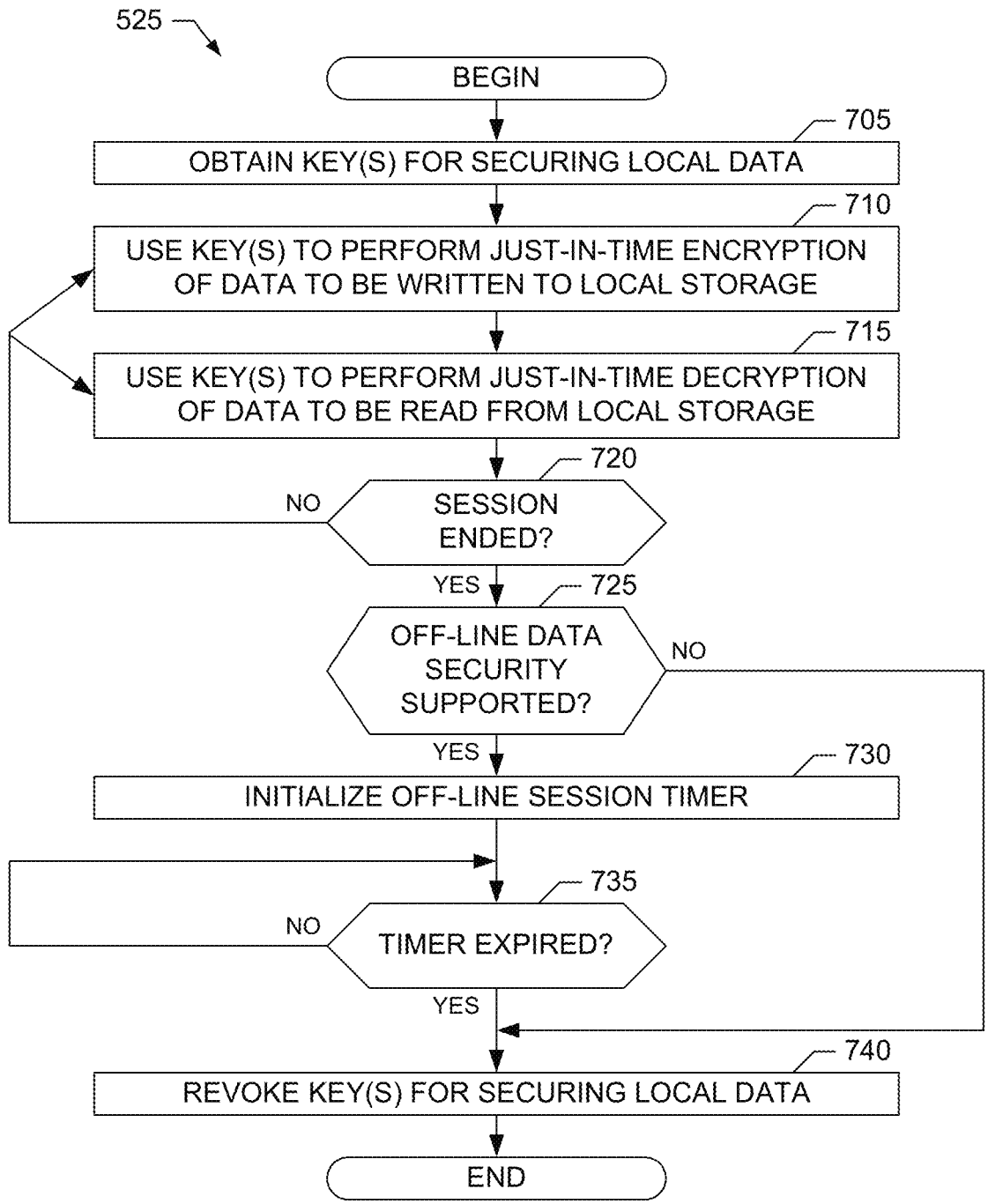
FIG. 7 is a flowchart representative of example machine readable instructions to secure local data that may be used to implement the example machine readable instructions of FIG. 5 and/or the example secure desktop of FIGS. 1 and/or 3.

Example machine readable instructions 500 that may be executed to implement the on-demand secure desktop 100 of FIGS. 1-4 are represented by the flowchart shown in FIG. 5. With reference to the preceding figures, the machine readable instructions 500 of FIG. 5 begin execution at block 505 at which the web browser 125 of the computing platform 105 is used to navigate to the secure desktop server 205 of the service node 160 in the provider network 150, as described above. At blocks 510 and 515, the on-demand secure desktop application 110 is downloaded to and executed by the web browser 125, as described above. At block 520, the on-demand secure desktop 110 establishes and provides the endpoint for the secure connection 115A with the trusted entity service node 160, as described above. Example machine readable instructions that may be used to implement the processing at block 520 are illustrated in FIG. 6, which is described in greater detail below. At block 525, the on-demand secure desktop 110 secures the local data 325, including any sensitive data associated with the trusted entity 145, that is used by the secure desktop 110 and/or any trusted application executing in the context of the secure desktop 110, as described above. Example machine readable instructions that may be used to implement the processing at block 525 are illustrated in FIG. 7, which is described in greater detail below.

Figure 8:
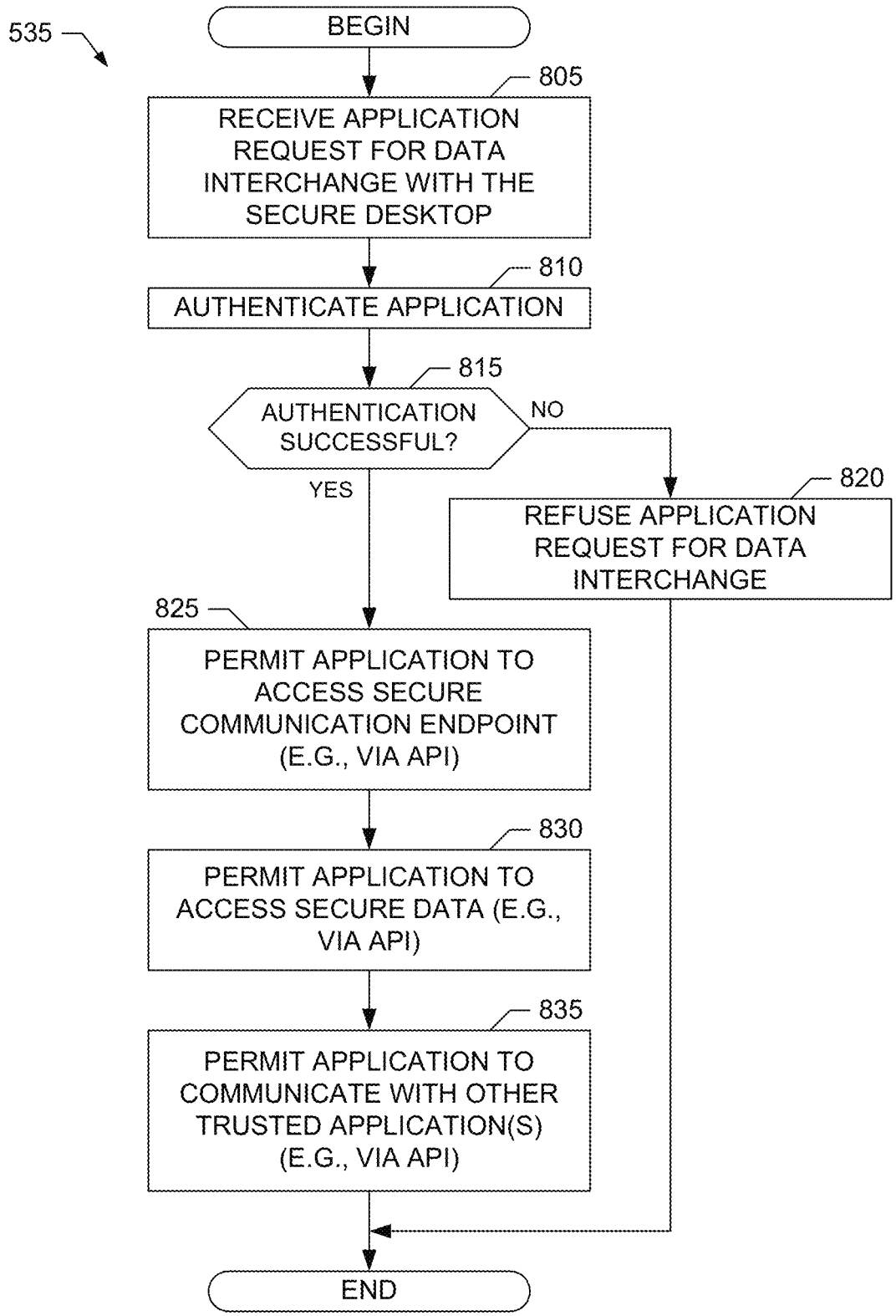
FIG. 8 is a flowchart representative of example machine readable instructions to implement an application programming interface that may be used to implement the example machine readable instructions of FIG. 5 and/or the example secure desktop of FIGS. 1 and/or 3.

At block 530, the on-demand secure desktop 110 causes the web browser 125 to navigate to the trusted application server 210 of the service node 160 to download trusted application(s), such as the trusted application(s) T_APP1, T_APP2, etc., for execution by the web browser 125. At block 535, the on-demand secure desktop 110 provides its API 330 to the downloaded trusted applications to enable them to be executed in the context of the secure desktop 110, as described above. Example machine readable instructions that may be used to implement the processing at block 535 are illustrated in FIG. 8, which is described in greater detail below. At block 540, the trusted application(s) downloaded at block 530 are executed by the web browser 125 in the context of the on-demand secure desktop 110.

At block 545, the on-demand secure desktop 110 accesses the session data storage 225 of the service node 160 to detect whether any session data exists for a prior virtual secure desktop session that may be resumed by the on-demand secure desktop 110. If such session data exists at the session data storage 225, then at block 550 the on-demand secure desktop 110 accesses this remotely stored session data for the prior secure desktop session. At block 555, the on-demand secure desktop 110 resumes the prior secure desktop session using the session data stored remotely at the session data storage 225 of the service node 160.

Example machine readable instructions 520 that may be executed to implement the secure connection endpoint 315 of the on-demand secure desktop 110 of FIG. 3, and/or used to implement the processing at block 520 of FIG. 5, are represented by the flowchart shown in FIG. 6. With reference to the preceding figures, the machine readable instructions 520 of FIG. 6 begin execution at block 605 at which the secure connection endpoint 315 generates a set of one or more session keys (e.g., public encryption keys, symmetric encryption keys, etc.) to be used to establish the secure connection 115A with the service node 160. For example, the secure connection endpoint 315 can use any type of key generation algorithm using any appropriate input information known by both the service node 160 (and/or the trusted entity 145) and the secure desktop 110 such that both the secure connection endpoint 315 and the service node 160 (and/or the trusted entity 145) independently generate the session key(s) for establishing the secure connection 115A. Such input information can include, for example, pre-exchanged user information (e.g., username, password, etc.) and/or biometric data provided by a user, data associated with a security token provided by the service node 160 (and/or the trusted entity 145) to a user of the computing platform 105, etc., or any combination thereof.

At block 610, the secure connection endpoint 315 uses the generated session key(s) to establish the secure connection 115A. When the communication session between the on-demand secure desktop 110 and the trusted entity 145 (e.g., via the service node 160) ends (block 615), at block 620 the secure connection endpoint 315 revokes (e.g., via randomization or other intentional overwriting and/or corruption of the stored key(s) to make the key(s) unusable) or otherwise discards the session key(s) and closes the secure connection 115A with the service node 160.

Example machine readable instructions 525 that may be executed to implement the encryption processor 320 of the on-demand secure desktop 110 of FIG. 3, and/or used to implement the processing at block 525 of FIG. 5, are represented by the flowchart shown in FIG. 7. With reference to the preceding figures, the machine readable instructions 525 of FIG. 7 begin execution at block 705 at which the secure connection endpoint 315 obtains a set of one or more security keys (e.g., public encryption keys, symmetric encryption keys, etc.) to be used by the encryption processor 320 to secure the local data 325 used by the secure desktop 110 and associated with the trusted entity 145, as described above. In some examples, the processing at block 705 of FIG. 6 can be omitted and the security key(s) obtained by the on-demand secure desktop 110 at block 705 of FIG. 7 may be the same as the session key(s) generated by the secure desktop 110 at block 605 of FIG. 6.

At blocks 710 and 715, the encryption processor 320 of the secure desktop 110 uses the security key(s) to perform just-in-time encryption of local data 325 to be written by the secure desktop 110 (or a trusted application executing in the context of the secure desktop 110) to the storage 140, and to perform just-in-time decryption of the local data 325 to be read by the secure desktop 110 (or a trusted application executing in the context of the secure desktop 110) from the storage 140, as described above. At block 720, the encryption processor 320 determines whether the secure connection 115A has been terminated and, thus, the current session between the on-demand secure desktop 110 and the trusted entity 145 has ended. If the current session between the secure desktop 110 and the trusted entity 145 has ended (block 720), then at block 725 the encryption processor 320 determines whether off-line data security is supported for local data associated with this particular trusted entity 145. If off-line data security is supported (block 725) and, thus, off-line access of the secure local data 325 associated with this trusted entity 145 is permitted, then at block 730 the encryption processor 320 initializes an off-line session timer or similar time counting mechanism to enable determination of whether a time period for off-line data access has expired, as described above. After the time period has expired (block 735) or if off-line data security is not supported (block 725), then at block 740 the encryption processor 320 revokes or otherwise discards the security key(s) associated with this trusted entity 145 to thereby prevent subsequent access to the local data 325 associated with the trusted entity 145.

Example machine readable instructions 535 that may be executed to implement the API 330 of the on-demand secure desktop 110 of FIG. 3, and/or used to implement the processing at block 535 of FIG. 5, are represented by the flowchart shown in FIG. 8. With reference to the preceding figures, the machine readable instructions 535 of FIG. 8 begin execution at block 805 at which the on-demand secure desktop 110 receives a request from an application to initiate a data interchange with the secure desktop 110. At block 810, the on-demand secure desktop 110 exposes the authentication API 350 of its API 330 to the application to enable the application to provide authentication information to the secure desktop 110, as described above. At block 815, the secure desktop 110 authenticates the application using the authentication information received via the authentication API 350. If the application is an untrusted application, such as one of the untrusted applications 130 or 135, then authentication is unsuccessful (block 815), and at block 820 the secure desktop 110 refuses the application's request to initiate the data interchange.

However, if the application is a trusted application, such as the trusted application T_APP1 or T_APP2, then authentication is successful (block 815), and at block 825 the on-demand secure desktop 110 exposes the communication API 335 of its API 330 to enable the trusted application to access the secure communication endpoint 315 of the secure desktop 110 and thereby access the secure connection 115A with the trusted entity service node 160, as described above. At block 830, the secure desktop 110 exposes the storage API 340 of its API 320 to enable the trusted application to access the secure local data 325 stored in the storage 140, as described above. At block 835, the secure desktop 110 exposes the inter-process API 345 of its API 320 to enable the trusted application to communicate with other trusted applications, such as the trusted applications T_APP1 and/or T_APP1, executing in the context of the on-demand secure desktop 110.

Figure 9:
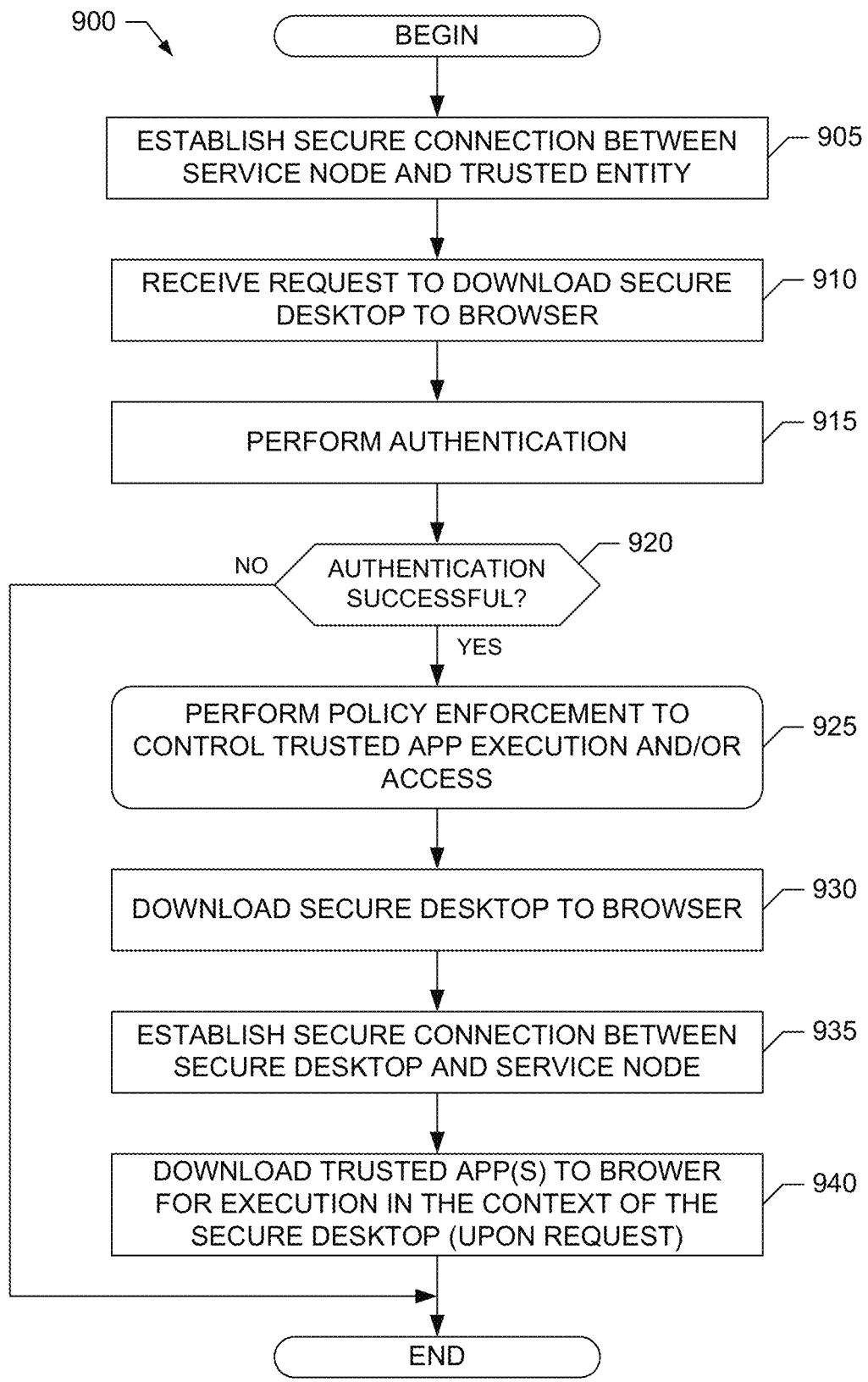
FIG. 9 is a flowchart representative of example machine readable instructions that may be executed to implement the example service node of FIGS. 1 and/or 2.

Example machine readable instructions 900 that may be executed to implement the service node 160 of FIGS. 1-4 are represented by the flowchart shown in FIG. 9. With reference to the preceding figures, the machine readable instructions 900 of FIG. 9 begin execution at block 905 at which the trusted entity gateway 215 of the service node 160 establishes the secure connection 155 with the trusted entity 145, as described above. At block 910, the secure desktop server 205 of the service node 160 receives a first request from the web browser 125 of the computing platform 105 to download the on-demand secure desktop application 110, as described above. At block 915, the secure desktop server 205 authenticates the computing platform 105 and/or a user associated with the request to download the on-demand secure desktop application 110. Any type of authentication can be employed by the processing at block 915.

Figure 10:
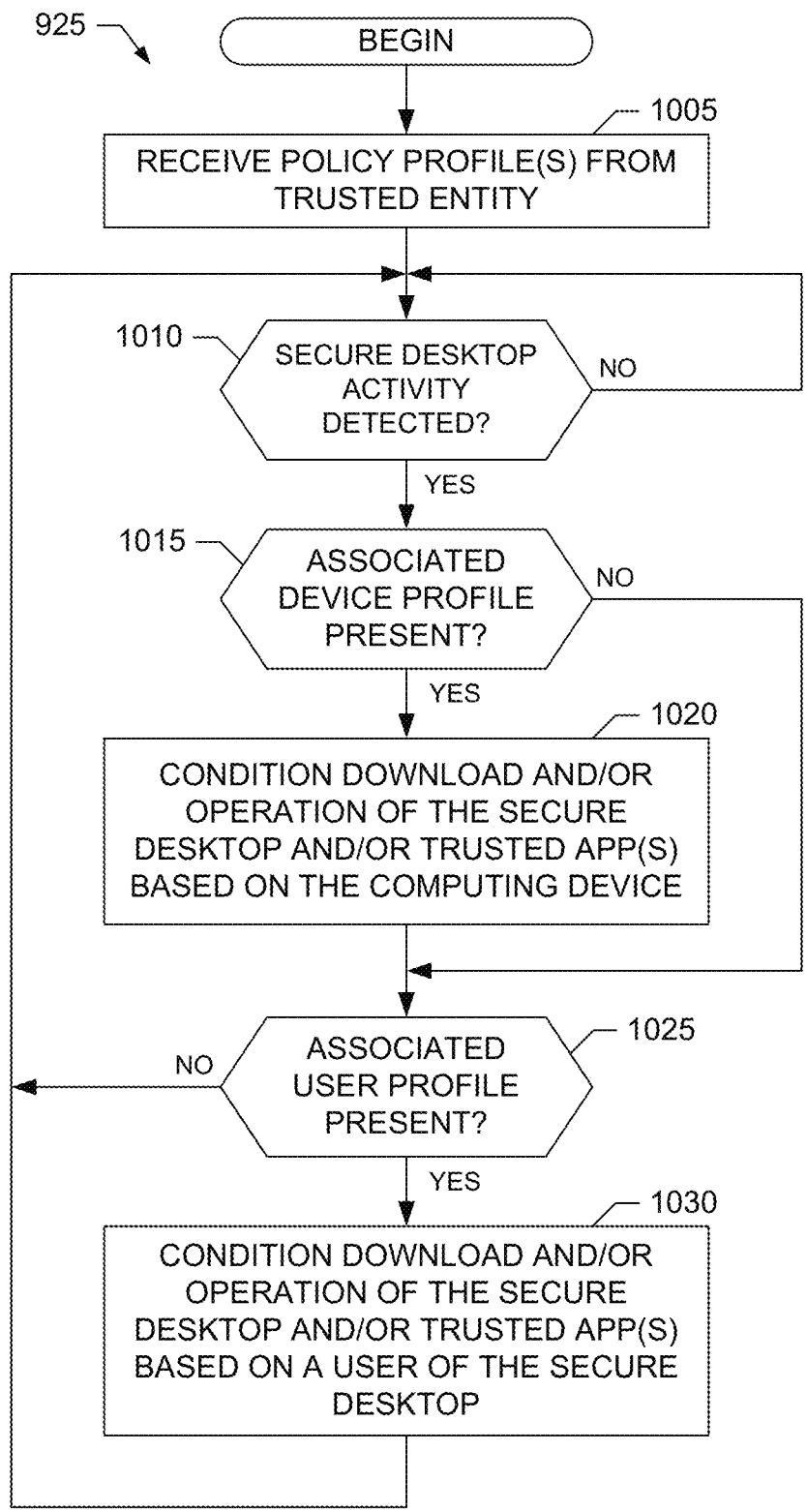
FIG. 10 is a flowchart representative of example machine readable instructions to perform policy enforcement that may be used to implement the example machine readable instructions of FIG. 9 and/or the example service node of FIGS. 1 and/or 2.

If authentication is successful (block 920), then at block 925 the policy enforcer 230 of the service node 160 processes device and/or user profiles associated with the computing platform 105 to perform policy enforcement to control operation of the on-demand secure desktop 110. Example machine readable instructions that may be used to implement the processing at block 925 are illustrated in FIG. 10, which is described in greater detail below. At block 930, the secure desktop server 205 downloads (in response to the first request received at block 910 and per the policy enforcement performed at block 925) the on-demand secure desktop application 110 to the web browser 125 of the computing platform 105, as described above. At block 935, the secure connection interface 220 of the service node 160 establishes the secure connection 115A with the on-demand secure desktop application 110, and connects the secure connection 115A with the secure connection 155 to the trusted entity 145. At block 940, the trusted application server 210 of the service node 160 receives second and subsequent request(s) from the web browser 125 of the computing platform 105 for trusted application(s) to be downloaded to the web browser 125. At block 940, the trusted application server 210 also downloads (in response to the second and subsequent request(s) and per the policy enforcement performed at block 925) the trusted application(s) to the web browser 125 for execution in the context of the on-demand secure desktop application 110.

Example machine readable instructions 925 that may be executed to implement the policy enforcer 230 of the service node 160 of FIG. 2, and/or used to implement the processing at block 925 of FIG. 9, are represented by the flowchart shown in FIG. 10. With reference to the preceding figures, the machine readable instructions 925 of FIG. 10 begin execution at block 1005 at which the profile storage 235 receives policy profile(s), such as user and/or device profile(s), from one or more trusted entities 145, and/or from the provider network 150. Policy profile(s) may be updated at, added to, removed from, etc., the profile storage 235 at any time and/or at any interval. At block 1010, the policy enforcer 230 determines whether secure desktop activity is detected, such as corresponding to a request for downloading of the on-demand secure desktop 110 and/or a request for downloading of a trusted application for execution in the context of the secure desktop 110.

If secure desktop activity is detected (block 1010), then at block 1015 the policy enforcer 230 determines whether a device profile exists in the profile storage 235 for the computing platform 105 executing the on-demand secure desktop 110 associated with the detected desktop activity. If such a device profile exists (block 1015), then at block 1020 the policy enforcer 230 processes the device profile to, for example, (1) determine whether to allow or deny download and/or execution of the on-demand secure desktop 110 on the computing platform 110, and/or (2) determine whether to allow or deny download and/or execution of one or more trusted applications on the computing platform 105, etc., as described above. At block 1025 the policy enforcer 230 determines whether a user profile exists in the profile storage 235 that is associated with the user of the computing platform 105 executing the on-demand secure desktop 110 associated with the desktop activity detected at block 1010. If such a user profile exists (block 1025), then at block 1030 the policy enforcer 230 processes the user profile to, for example, (1) determine whether to allow or deny download and/or execution of the on-demand secure desktop 110 on the computing platform 110, and/or (2) determine whether to allow or deny download and/or execution of one or more trusted applications on the computing platform 105, etc., as described above.

Figure 11:
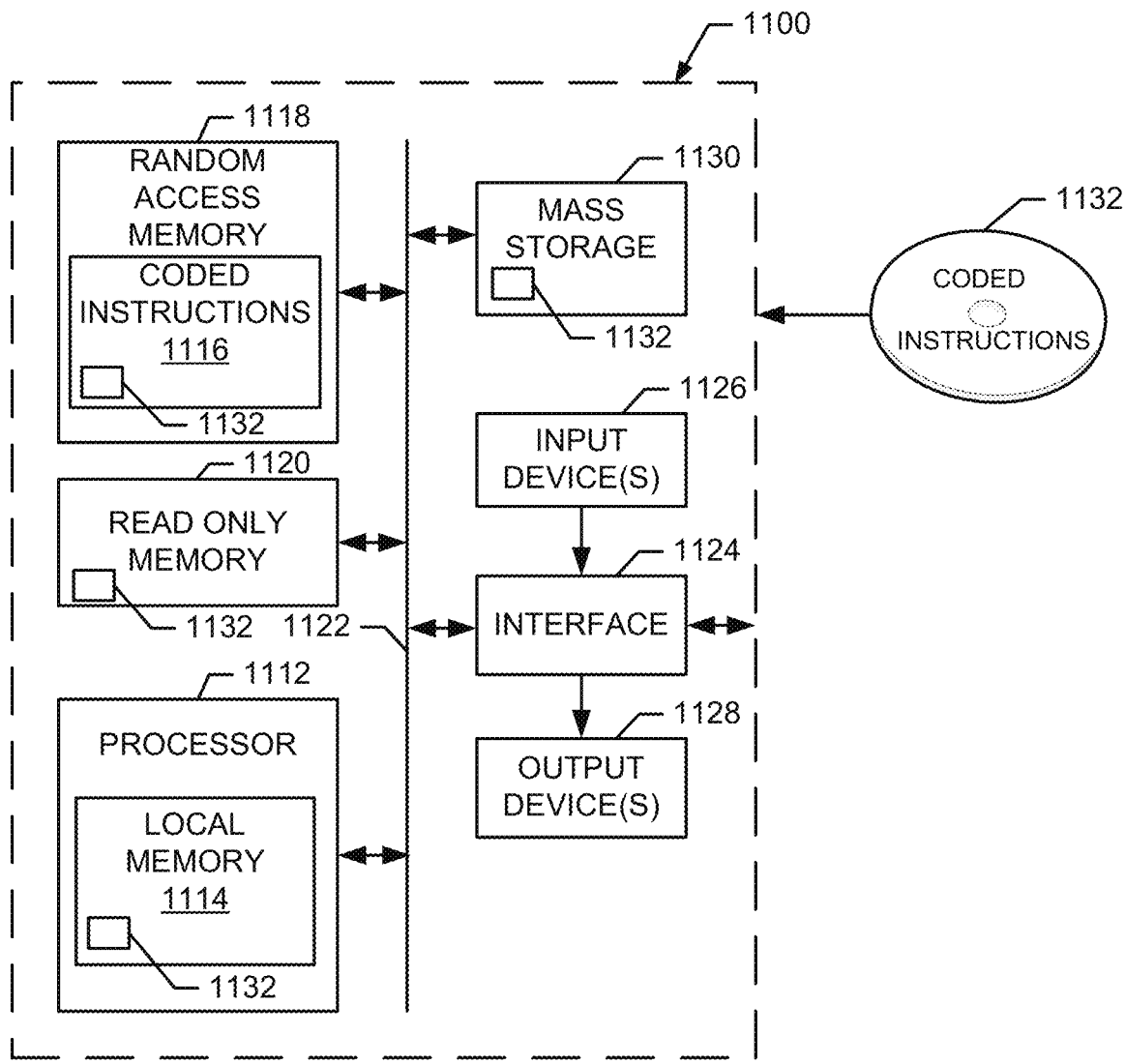
FIG. 11 is a block diagram of an example processing system that may execute the example machine readable instructions of FIGS. 5-9 and/or 10 to implement the example secure desktop of FIGS. 1 and/or 3, and/or the example service node of FIGS. 1 and/or 2.

FIG. 11 is a block diagram of an example processing system 1100 capable of implementing the apparatus and methods disclosed herein. The processing system 1100 can be, for example, a smartphone, a mobile phone, a personal computer, a personal digital assistant (PDA), an Internet appliance, a server, a set top box, a digital video recorder, a personal video recorder, a DVD player, a CD player, etc., or any other type of computing device.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, the machine readable instructions represented in FIGS. 5-10. The processor 1112 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives. In some examples, the mass storage device 1130 may implement the storage 140, session data storage 225 and/or the profile storage 235. Additionally or alternatively, in some examples the volatile memory 1118 may implement the storage 140, session data storage 225 and/or the profile storage 235.

The coded instructions 1132 of FIGS. 5-10 may be stored in the mass storage device 1130, in the volatile memory 1118, in the non-volatile memory 1120, in the local memory 1114 and/or on a removable storage medium, such as a CD or DVD 1132.

At least some of the above described example methods and/or apparatus are implemented by one or more software and/or firmware programs running on a computer processor. However, dedicated hardware implementations including, but not limited to, application specific integrated circuits, programmable logic arrays and/or other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples. Such standards are periodically superseded by faster or more efficient equivalents having similar functionality. Accordingly, replacement standards and protocols having similar functions are equivalents which are contemplated by this patent and are intended to be included within the scope of the accompanying claims.

Additionally, as used herein, when the phrase "at least" is used as a preamble of a claim, it is open-ended in the same manner as the term "comprising" is open ended.

Furthermore, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to provide secure desktop functionality, the method comprising:
providing, in response to a first request, a first secure desktop application to a first computing platform, the first secure desktop application to be executed by a first browser on the first computing platform; and
establishing a secure communication connection between a service node and the first secure desktop application, the secure communication connection to exchange personal information between the first secure desktop application and a trusted entity server via the service node during a first secure desktop session associated with the first secure desktop application, the trusted entity server being separate from the service node and the first computing platform, the secure communication connection also being accessible to a trusted application downloaded to the first computing platform, the trusted application being different from the first secure desktop application and to be executed by the first browser in association with the first secure desktop application, the secure communication connection being inaccessible to an untrusted application not executed in association with the first secure desktop application.

2. The method of claim 1, further comprising providing, in response to a second request, the trusted application to the first computing platform.

3. The method of claim 1, further comprising storing first data remotely from the first computing platform, the first data associated with the first secure desktop session.

4. The method of claim 3, further comprising permitting a second secure desktop application executed by a second browser on a second computing platform to use the first data to join the first secure desktop session.

5. The method of claim 1, further comprising:
receiving a policy profile from the trusted entity server; and
enforcing a policy to control at least one of download of the trusted application to the first browser on the first computing platform or access to the trusted entity server by the trusted application based on the policy profile.

6. The method of claim 5, wherein the policy profile comprises a user profile, and enforcing the policy comprises determining whether to permit the trusted application to have access to the trusted entity server via the secure communication connection based on a comparison of user information for a user of the first secure desktop application with the user profile.

7. The method of claim 5, wherein the policy profile comprises a device profile, and enforcing the policy comprises determining whether to permit the trusted application to be downloaded to the first browser on the first computing platform by comparing descriptive information for the first computing platform with the device profile.

8. The method of claim 1, further comprising, after execution of the first secure desktop application by the first browser on the first computing platform is terminated, permitting a second secure desktop application executed by a second browser on a second computing platform different from the first computing platform to resume the first secure desktop session using stored data associated with the first secure desktop session.

9. A tangible machine readable medium comprising machine readable instructions which, when executed, cause a machine to perform operations comprising:
providing, in response to a first request, a first secure desktop application to a first computing platform, the first secure desktop application to be executed by a first browser on the first computing platform; and
establishing a secure communication connection between a service node and the first secure desktop application, the secure communication connection to exchange personal information between the first secure desktop application and a trusted entity server via the service node during a first secure desktop session associated with the first secure desktop application, the trusted entity server being separate from the service node and the first computing platform, the secure communication connection also being accessible to a trusted application downloaded to the first computing platform, the trusted application being different from the first secure desktop application and to be executed by the first browser in association with the first secure desktop application, the secure communication connection being inaccessible to an untrusted application not executed in association with the first secure desktop application.

10. The tangible machine readable medium of claim 9, wherein the operations further comprise providing, in response to a second request, the trusted application to the first computing platform.

11. The tangible machine readable medium of claim 9, wherein the operations further comprise storing first data associated with the first secure desktop session remotely from the first computing platform.

12. The tangible machine readable medium of claim 11, wherein the operations further comprise permitting a second secure desktop application executed by a second browser on a second computing platform to use the first data to join the first secure desktop session.

13. The tangible machine readable medium of claim 9, wherein the operations further comprise:
receiving a policy profile from the trusted entity server; and
enforcing a policy to control at least one of download of the trusted application to the first browser on the first computing platform or access to the trusted entity server by the trusted application based on the policy profile.

14. The tangible machine readable medium of claim 13, wherein the policy profile comprises a user profile, and enforcing the policy comprises determining whether to permit the trusted application to have access to the trusted entity server via the secure communication connection based on a comparison of user information for a user of the first secure desktop application with the user profile.

15. The tangible machine readable medium of claim 13, wherein the policy profile comprises a device profile, and enforcing the policy comprises determining whether to permit the trusted application to be downloaded to the first browser on the first computing platform by comparing descriptive information for the first computing platform with the device profile.

16. The tangible machine readable medium of claim 9, wherein the operations further comprise, after execution of the first secure desktop application by the first browser on the first computing platform is terminated, permitting a second secure desktop application executed by a second browser on a second computing platform different from the first computing platform to resume the first secure desktop session using stored data associated with the first secure desktop session.

17. A service node comprising:
a memory comprising machine readable instructions; and
a processor to execute the instructions to perform operations comprising:
providing, in response to a first request, a first secure desktop application to a first computing platform, the first secure desktop application to be executed by a first browser on the first computing platform, the processor to provide, in response to a second request, a trusted application different from the first secure desktop application to the first computing platform, the trusted application to be executed by the first browser in association with the first secure desktop application;
establishing a secure communication connection with the first secure desktop application, the secure communication connection to facilitate an exchange of personal information between the first secure desktop application and a trusted entity server via the service node during a first secure desktop session associated with the first secure desktop application, the trusted entity server being separate from the service node and the first computing platform, the secure communication connection being accessible to the trusted application, the secure communication connection being inaccessible to an untrusted application not executed in association with the first secure desktop application; and
permitting a second secure desktop application executed by a second browser on a second computing platform different from the first computing platform to resume the first secure desktop session using stored first data associated with the first secure desktop session after execution of the first secure desktop application by the first browser on the first computing platform has been terminated.

18. The service node of claim 17, further comprising storage to store the first data associated with the first secure desktop session remotely from the first computing platform, and wherein the operations further comprise permitting a third secure desktop application executed by a third browser on a third computing platform to use the stored first data to join the first secure desktop session.

19. The service node of claim 17, wherein the operations further comprise:
receiving a policy profile from the trusted entity server; and
enforcing a policy to control at least one of download of the trusted application to the first browser on the first computing platform or access to the trusted entity server by the trusted application based on the policy profile.

20. The service node of claim 19, wherein the policy profile comprises a user profile and a device profile, and the operations further comprise:
determining whether to permit the trusted application to be downloaded to the first browser on the first computing platform based on comparing descriptive information for the first computing platform with the device profile; and
determining whether to permit the trusted application to have access to the trusted entity server via the secure communication connection based on comparing user information for a user of the first secure desktop application with the user profile.

* * * * *